Feb. 14, 1956 P. R. WEAVER 2,734,276
DEVELOPMENT OF TECHNIQUE FOR HIGH TEMPERATURE
STRESS-STRAIN MEASUREMENTS
Filed July 6, 1950
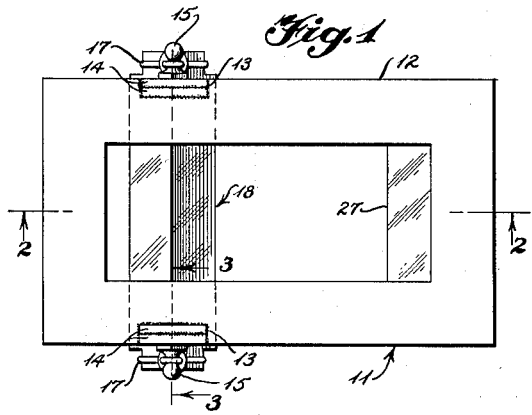
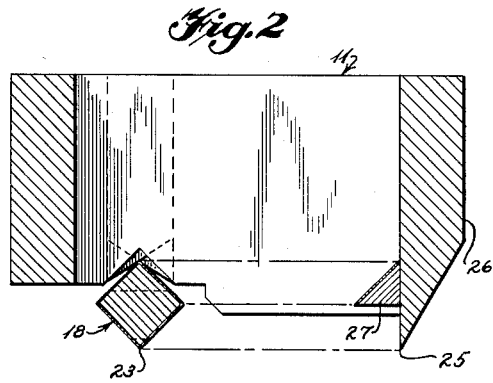
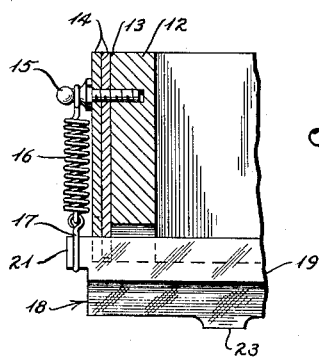
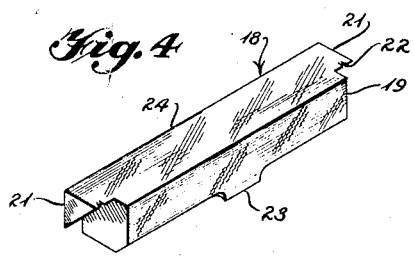
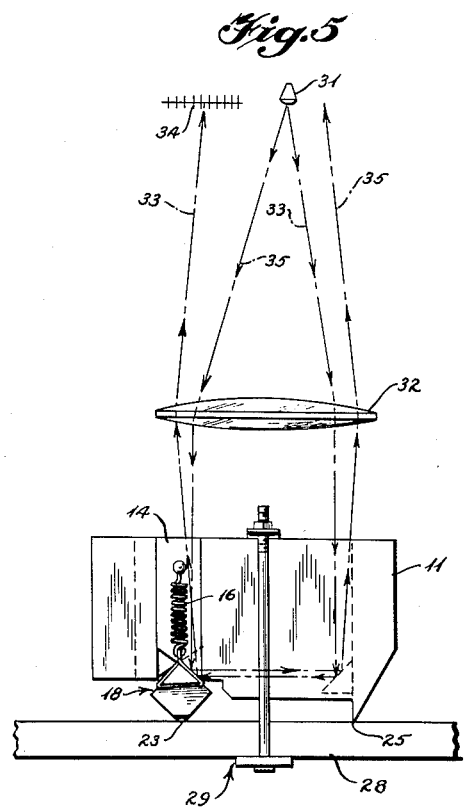
Inventor
Preston R. Weaver
By J. J. Schmitt
Walter S. Paul
Attorneys United States Patent Office 2,734,276
Patented Feb. 14, 1956

2,734,276

DEVELOPMENT OF TECHNIQUE FOR HIGH TEMPERATURE STRESS-STRAIN MEASUREMENTS

Preston R. Weaver, Rockville, Md.

Application July 6, 1950, Serial No. 172,371

2 Claims. (Cl. 33—148)

(Granted under Title 35, U. S. Code (1952), sec. 266)

The present invention relates to a strain gage and more particularly to a strain gage of the optical type for use at elevated temperatures.

The advent of supersonic flight has created a need for the investigation of stresses in parts of an aircraft which are subject to elevated temperatures during operation. Certain components of the structure of an aircraft, whether piloted or pilotless, traveling at supersonic speeds may attain temperatures as high as 1000° F., due to skin friction. Similarly, portions of turbo-jet and ram-jet motors aft of the burners may attain temperatures between 1000° F. and 2000° F., while rocket type engine temperatures may even be higher.

In the measurement of the stresses of these structures, the gage employed should be of the remote indicating type, due to the impracticability of having observers positioned close to the high temperature areas. However, if any linkages or extensions are employed, the indications will be in error, due to the differential expansion of the linkages operating at different temperatures. Similarly, unless the gage is mounted directly on the specimen and thereby subjected to the same temperatures, additional errors will be introduced.

The present invention proposes to overcome these and other disadvantages of the prior art by the provision of a simple gage for use in an optical system, the gage being constructed to withstand damage thereto when operated at elevated temperatures. The gage, according to the present invention comprises a block of ceramic material and a pair of relatively movable reflecting surfaces mounted thereon, the relative movement between the surfaces being an indication of the strain to be measured.

Accordingly, it is an object of the present invention to provide a strain gage of the optical type for use at elevated temperatures.

Another object is the provision of an optical type strain gage which may be mounted directly upon the specimen to be tested, and is not affected adversely by operation at elevated temperatures.

A further object is to provide an optical type strain gage for operation at elevated temperatures, which is relatively simple of construction but is highly sensitive at all temperatures.

The exact nature of this invention as well as other objects and advantages thereof will be readily apparent from consideration of the following detailed description relating to the annexed drawing in which:

Fig. 1 is a plan view of the strain gage according to the present invention;

Fig. 2 is a sectional view taken along the line 2—2 of Fig. 1;

Fig. 3 is a sectional view taken along the line 3—3 of Fig. 1, illustrating one means for attaching the rotatable surface to the block;

Fig. 4 is a perspective view of the rotatable reflecting surface of Fig. 1; and

Fig. 5 is a schematic diagram, partly in front elevation, of one form of optical system in which the gage of the present invention may be employed.

Referring now to the drawings, wherein like reference characters designate like or corresponding parts throughout the several views, there is shown in Fig. 1 a strain gage according to the present invention. The strain gage comprises a frame or block 11 of ceramic material, and preferably of open rectangular construction. Block 11 is constructed of ceramic material in order to withstand operation at elevated temperatures.

Provided in each of sides 12 of block 11 adjacent one end thereof is a groove 13, into which are fitted side plates 14, plates 14 being fused or otherwise secured to block 11 after proper positioning. As shown in Fig. 2, the lower end of each of plates 14 is cut at an angle, these lower ends being positioned in reversed relationship during assembly. The angle between the lower ends of plates 14 is preferably substantailly 110°, for the purpose set forth below. Similarly, the lower ends of sides 12 along the portions thereof aligned with plates 14 are cut at an angle of approximately 90° or greater, as shown in Fig. 2.

Secured adjacent the upper end of each of sides 12 by means of a stud 15 extending through plates 14 and into side 12, as shown in Fig. 3, is one end of a coil spring 16, the other end of which carries a bracket 17. Carried between brackets 17 is a lozenge, generally designated 18, lozenge 18 forming the movable reflecting surface of the present invention.

As shown in Fig. 4, lozenge 18 comprises an elongated central body 19, preferably square in cross-section, and a pair of integral extensions 21 positioned at opposite ends of body 19, respectively. Extensions 21 are preferably of triangular cross-section and provided with suitable grooves 22 in which brackets 17 are mounted. The corner of body 19 opposite the apex of triangular extensions 21 is cut away along the entire length of body 19 except for a small amount on either side of the center. In this manner a centrally located knife edge 23 is formed, as shown in Figs. 3 and 4.

In assembly, the corner 24 of body 19 aligned with the apex of extensions 21 is positioned along the line joining the points of intersection of the lower ends of plates 14, as shown in Fig. 2, knife edge 23 thereby being the lowermost point of lozenge 18. By making the angle between the lower ends of plates 14 substantially 110°, and by cutting away the lower ends of sides 12, lozenge 18 is free to rotate about corner 24.

The second and fixed knife edge 25 of the gage is formed by cutting away the lower portion of end 26 of block 11, as shown in Fig. 2. Suitably secured to block 11 along end 26 thereof is an elongated member 27, member 27 forming the fixed reflecting surface of the gage. As shown in Fig. 2, member 27 is preferably of an isosceles right triangular shape in cross-section, the apex and one side thereof being vertically aligned with knife edge 25, and the other one side thereof being horizontally aligned with the side corners of body 19 of lozenge 18 (adjacent knife edge 23).

In order to render the gage susceptible to use at elevated temperatures, body 19 and member 27 are made of fused quartz, and are coated with rutile to provide a light reflecting surface, as shown in Fig. 2. The thickness of the rutile coating is preferably one quarter of the wave length of the light used in the optical system. A suitable ceramic material for block 11, which exhibits satisfactory expansion and hardness characteristics at all contemplated temperatures, is mullite.

In operation in a suitable optical system, gage block 11 is mounted on work piece 28 in any suitable manner as by means of clamp 29. Light waves from any suitable external source 31 are directed through an objective lens 32 onto the reflecting surfaces of the gage. If the angle between the fixed and movable reflecting surfaces is initially set at 90°, any light rays from source 31 striking either surface will be reflected from that surface to the other surface and then back to source 31.

On the other hand, if the angle changes, due to rotation of lozenge 18 caused by deflection of work piece 28, one ray 33 will strike the fixed reflecting surface, be reflected to the movable reflecting surface, and from there be reflected to indicator 34. A ray 35 first striking the movable reflecting surface would not be visible at indicator 34. Similarly, if lozenge 18 were rotated in the opposite direction, ray 35 would become visible in indicator 34, while ray 33 would not appear on the indicator. In this manner, quantitative strain analysis in both tension and compression may be had.

It is thus seen that the present invention provides a simple and inexpensive optical strain gage which is readily usable at elevated temperatures. Because of its construction, it is relatively unaffected by operation at elevated temperatures. Furthermore, by positioning the fixed reflective surface directly over the fixed knife edge, the errors introduced are substantially reduced. Finally the composition of the block and the reflecting surfaces enable the use of the gage at elevated temperatures without any disruption in the reflecting characteristics or without any distortion in the gage.

It should be understood, of course, that the foregoing disclosure relates to only a preferred embodiment of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. For use in a strain gage system, a gage comprising a gage block composed of ceramic material and having at least two sides and an end connecting said sides together in fixed relation to each other, said end having an integral work piece contacting knife edge of said ceramic material, a light reflector carried by said block, said sides having a pair of horizontally aligned downwardly opening notches therein, a member having an upper edge and a lower work piece contacting knife edge intermediate the ends of said member, said upper edge being pivotally located in said notches, means located at the outer surface of said sides and connected thereto and displaced out of the high temperature zone of said work piece contacting knife edge for yieldingly retaining said member in such position that its upper edge is held yieldingly and pivotally movable in said notches, said member being provided with a reflection surface arranged to reflect light to and from said light reflector, and said block having a vision opening between said sides in which said reflection surface and said reflector are located.

2. The construction of claim 1 and said knife edge of said member being shorter than said member.

References Cited in the file of this patent

UNITED STATES PATENTS

| | | |
|---|---|---|
| 1,736,682 | Tuckerman | Nov. 19, 1929 |
| 2,278,194 | Donnell | Mar. 31, 1942 |
| 2,332,573 | Hibschman et al. | Oct. 26, 1943 |
| 2,466,119 | Moulton | Apr. 5, 1949 |
| 2,478,817 | Gaiser | Aug. 9, 1949 |
| 2,484,164 | Hathaway | Oct. 11, 1949 |
| 2,552,185 | Koch | May 8, 1951 |

FOREIGN PATENTS

| | | |
|---|---|---|
| 279,491 | Great Britain | Oct. 21, 1927 |

OTHER REFERENCES

Article: Fused Quartz by W. M. Johnson in Chemical Industries, October 1943. (Copy in 33-materials.)

Article: Optical Strain Gages and Extensometers by Z. B. Tuckerman, pages 8 and 9. (Copy in 88-14 EG.)